US012590605B2

(12) United States Patent
Matsui et al.

(10) Patent No.: US 12,590,605 B2
(45) Date of Patent: Mar. 31, 2026

(54) CROWN-TYPE RETAINER FOR BALL BEARINGS, AND BALL BEARING

(71) Applicant: NSK LTD., Tokyo (JP)

(72) Inventors: Masahito Matsui, Kanagawa (JP); Takefumi Kichikawa, Kanagawa (JP)

(73) Assignee: NSK LTD., Tokyo (JP)

( * ) Notice: Subject to any disclaimer, the term of this patent is extended or adjusted under 35 U.S.C. 154(b) by 172 days.

(21) Appl. No.: 18/272,695

(22) PCT Filed: Jan. 17, 2022

(86) PCT No.: PCT/JP2022/001445
§ 371 (c)(1),
(2) Date: Jul. 17, 2023

(87) PCT Pub. No.: WO2022/154124
PCT Pub. Date: Jul. 21, 2022

(65) Prior Publication Data
US 2024/0077109 A1 Mar. 7, 2024

(30) Foreign Application Priority Data

Jan. 18, 2021 (JP) ................................. 2021-005913

(51) Int. Cl.
*F16C 33/41* (2006.01)
*F16C 19/06* (2006.01)
(52) U.S. Cl.
CPC ............ *F16C 33/416* (2013.01); *F16C 19/06* (2013.01); *F16C 33/418* (2013.01)

(58) Field of Classification Search
CPC .. F16C 33/3887; F16C 19/06; F16C 2208/60; F16C 33/41–418
See application file for complete search history.

(56) References Cited

U.S. PATENT DOCUMENTS

| 11,078,959 B1 * | 8/2021 | Zhong ................. F16C 33/3856 |
| 2010/0046875 A1 | 2/2010 | Doyer et al. |
| 2010/0142874 A1 | 6/2010 | Doyer et al. |

(Continued)

FOREIGN PATENT DOCUMENTS

| JP | 2002147463 A * | 5/2002 | ............ F16C 33/416 |
| JP | 2008-274977 A | 11/2008 | |
| JP | 2010-60001 A | 3/2010 | |

(Continued)

OTHER PUBLICATIONS

International Search Report (PCT/ISA/210) issued Apr. 5, 2022 by the International Searching Authority in counterpart International Patent Application No. PCT/JP2022/001445.

(Continued)

*Primary Examiner* — James Pilkington
*Assistant Examiner* — Aimee Tran Nguyen
(74) *Attorney, Agent, or Firm* — Sughrue Mion, PLLC

(57) ABSTRACT

An outer diameter of a claw portion is smaller than an outer diameter of a main portion, a radial width of the claw portion is ½ or less of a radial width of the main portion, an axial width from an upper surface of a connection portion of a pillar portion to a bottom surface of the main portion is ½ or less of an axial width of a crown type cage for a ball bearing, and in the main portion, an opening portion is provided between adjacent pockets.

5 Claims, 11 Drawing Sheets

(56) References Cited

U.S. PATENT DOCUMENTS

2018/0106295 A1    4/2018  Koda et al.

FOREIGN PATENT DOCUMENTS

| | | | |
|---|---|---|---|
| JP | 2010-516967 | A | 5/2010 |
| JP | 5436204 | B2 | 3/2014 |
| JP | 2016-169766 | A | 9/2016 |
| JP | 2018-44602 | A | 3/2018 |
| JP | 2018044602 | A * | 3/2018 |
| KR | 102045291 | B1 * | 11/2019 |

OTHER PUBLICATIONS

Written Opinion (PCT/ISA/237) issued Apr. 5, 2022 by the International Searching Authority in counterpart International Patent Application No. PCT/JP2022/001445.
Office Action dated Aug. 1, 2023, issued by Japanese Patent Office in Japanese Patent Application No. 2022-548218.

* cited by examiner

MAXIMUM
PRINCIPAL STRESS

PRIOR ART

PRIOR ART

CROWN-TYPE RETAINER FOR BALL BEARINGS, AND BALL BEARING

CROSS-REFERENCE TO RELATED APPLICATIONS

This application is a National Phase Entry of PCT International Application No. PCT/JP2022/001445, filed on Jan. 17, 2022, which claims priority to Japanese Patent Application No. Application No. 2021-005913, filed on Jan. 18, 2021, the contents of all of which are incorporated herein by reference in their entirety.

TECHNICAL FIELD

The present invention relates to a crown type cage for a ball bearing, and a ball bearing.

BACKGROUND ART

Generally, a ball bearing 1 as shown in FIG. 14 is used to support rotating parts of various rotary machines. The ball bearing 1 includes an inner ring 3 having an inner ring raceway 2 on the outer peripheral surface thereof, an outer ring 5 disposed concentrically with the inner ring 3 and having an outer ring raceway 4 on the inner peripheral surface thereof, and a plurality of balls 6 arranged to freely roll between the inner ring raceway 2 and the outer ring raceway 4.

Each ball 6 is rotatably held by a cage 100. In addition, outer peripheral edges of a pair of circular ring-shaped shield plates 7 and 7 are respectively locked to both end portions of the inner peripheral surface of the outer ring 5 in the axial direction. The pair of shield plates 7 and 7 prevents lubricant such as grease existing in the bearing space from leaking to the outside and dust floating outside from entering the bearing space. As a sealing device, a contact type seal may be used instead of the non-contact type shield plates 7 and 7.

The cage 100 is a resin crown type cage, as shown in FIGS. 15 and 16. The cage 100 includes an annular main portion 109, a plurality of pillar portions 110 protruding in the axial direction from the main portion 109 at predetermined intervals in the peripheral direction, and a spherical pocket 111 formed between the adjacent pillar portions 110 and capable of holding the balls 6.

The pillar portion 110 has a pair of claw portions 112 and 112 of which tip end portions are spaced apart from each other. The two adjacent claw portions 112 and 112 forming the pocket 111 hold the ball 6, thereby preventing the cage 100 from slipping out from between the outer ring 5 and the inner ring 3 in the axial direction.

Incidentally, with the recent electrification of automobiles, rolling bearings (especially ball bearings) that support the rotation shafts of motors are required to rotate at high speed. In order to achieve high-speed rotation, it is required that (i) the centrifugal force expansion of the cage is suppressed and the stress generated at the bottom portion of the pocket is reduced to prevent fatigue fracture, and (ii) the deformation of the cage is suppressed to avoid contact of the cage with the outer ring and the seal, and suppress wear, vibration, and heat generation of the cage.

In the cage 100 of the related art as shown in FIGS. 14 to 16, there is a possibility that stress acts on the cage 100 due to the centrifugal force during high-speed rotation, and the cage 100 deforms to the outer diameter side. In FIG. 14, broken lines show how the cage 100 is deformed. In this case, the cage 100 comes into contact with the outer ring 5 (refer to a part A in FIG. 14), or the cage 100 comes into contact with the shield plate 7 (refer to a part B in FIG. 14), there is concern that the cage 100 will wear, vibrate, and generate heat.

Patent Literature 1 and Patent Literature 2 disclose techniques for reducing the weight of the cage.

Specifically, Patent Literature 1 discloses that a thinned portion is formed on the end surface of the crown type cage opposite to the end surface on the pocket forming portion side. This thinned portion improves the left-right mass balance in the axial direction of the crown type cage and reduces the weight of the back surface side part.

Further, the cage disclosed in Patent Literature 2 has an annular base portion and an axial portion extending in the axial direction from the base portion. The outer diameter of the axial portion is smaller than the outer diameter of the base portion. The base portion is formed with a hole that communicates with the recessed area of the axial portion and penetrates therethrough in the axial direction. Therefore, it is intended to reduce the amount of material and suppress deformation in the radial direction induced during high-speed rotation.

CITATION LIST

Patent Literature

Patent Literature 1: JP2008-274977A
Patent Literature 2: JP5436204B

SUMMARY OF INVENTION

Technical Problem

However, in order to adapt the bearing to higher speed rotation, it is necessary to further reduce the weight of the cage.

The present invention has been made in view of the above circumstances, and an object thereof is to provide a crown type cage for a ball bearing and a ball bearing capable of suppressing deformation by reducing the centrifugal force during high-speed rotation by reducing weight.

Solution to Problem

The above objects of the present invention are achieved by the following configurations.

(1) A crown type cage for a ball bearing including:
an annular main portion;
a plurality of pillar portions protruding in an axial direction from the main portion at predetermined intervals in a peripheral direction; and
a spherical pocket formed between the adjacent pillar portions and having a spherical recessed surface capable of holding a ball, in which
the pillar portion has a pair of claw portions of which tip end portions are spaced apart from each other and a connection portion that connects the pair of claw portions,
an inlet having a width shorter than a diameter of the ball and for inserting the ball is provided between the tip end portions of the two adjacent claw portions forming the pocket,
a radius of curvature of the spherical recessed surface of the pocket is greater than a radius of curvature of a rolling surface of the ball, an outer diameter D1 of the claw portion is smaller than an outer diameter D2 of the main portion, a radial width t1 of the claw portion is ½ or less of a radial width t2 of the main portion, an axial width H1 from an upper surface of the connection portion of the pillar portion to a bottom surface of the main portion is ½ or less of an axial width H2 of the crown type cage for a ball bearing, and in the main portion, an opening portion that opens in the axial direction is provided between the adjacent pockets, the claw portion and the opening portion are provided offset in a radial direction, and the opening portion is positioned on a radially outer side of the claw portion.

(2) The crown type cage for a ball bearing according to (1), in which the axial width H1 from the upper surface of the connection portion of the pillar portion to the bottom surface of the main portion is greater than an axial width H3 of the main portion at a bottom portion of the pocket.

(3) The crown type cage for a ball bearing according to (1) or (2), in which the bottom surface of the main portion has a projection portion protruding in the axial direction between the adjacent opening portions.

(4) The crown type cage for a ball bearing according to (3), in which a radial range and a peripheral range in which the projection portion is provided are substantially the same as a radial range and a peripheral range in which the spherical recessed surface of the main portion forming the pocket is provided.

(5) The crown type cage for a ball bearing according to any one of (1) to (4), in which a radial width of the claw portion decreases from the main portion side toward the tip end portion side of the claw portion.

(6) The crown type cage for a ball bearing according to any one of (1) to (5), in which the claw portion has a first peripheral surface forming the pocket and a second peripheral surface opposite to the first peripheral surface, and in the two adjacent claw portions that form the pocket, a peripheral distance between the two second peripheral surfaces decreases from the main portion side toward the tip end portion side of the claw portion.

(7) A ball bearing including:

an outer ring;

an inner ring;

a plurality of the balls arranged between a raceway ring of the outer ring and a raceway surface of the inner ring; and the crown type cage for a ball bearing according to any one of (1) to (6).

Advantageous Effects of Invention

With the crown type cage for a ball bearing and a ball bearing of the present invention, the centrifugal force at the time of high-speed rotation can be reduced by weight reduction, and deformation can be suppressed.

BRIEF DESCRIPTION OF DRAWINGS

FIG. 10A shows a cage of the related art, FIG. 10B shows a cage of Example 1, and FIG. 10C shows a cage of Example 2.

FIG. 12A shows a cage of the related art, FIG. 12B shows a cage of Example 1, and FIG. 12C shows a cage of Example 2.

DESCRIPTION OF EMBODIMENTS

A crown type cage for a ball bearing and a ball bearing according to one embodiment of the present invention will be described below with reference to the drawings.

First Embodiment

Figure 15:
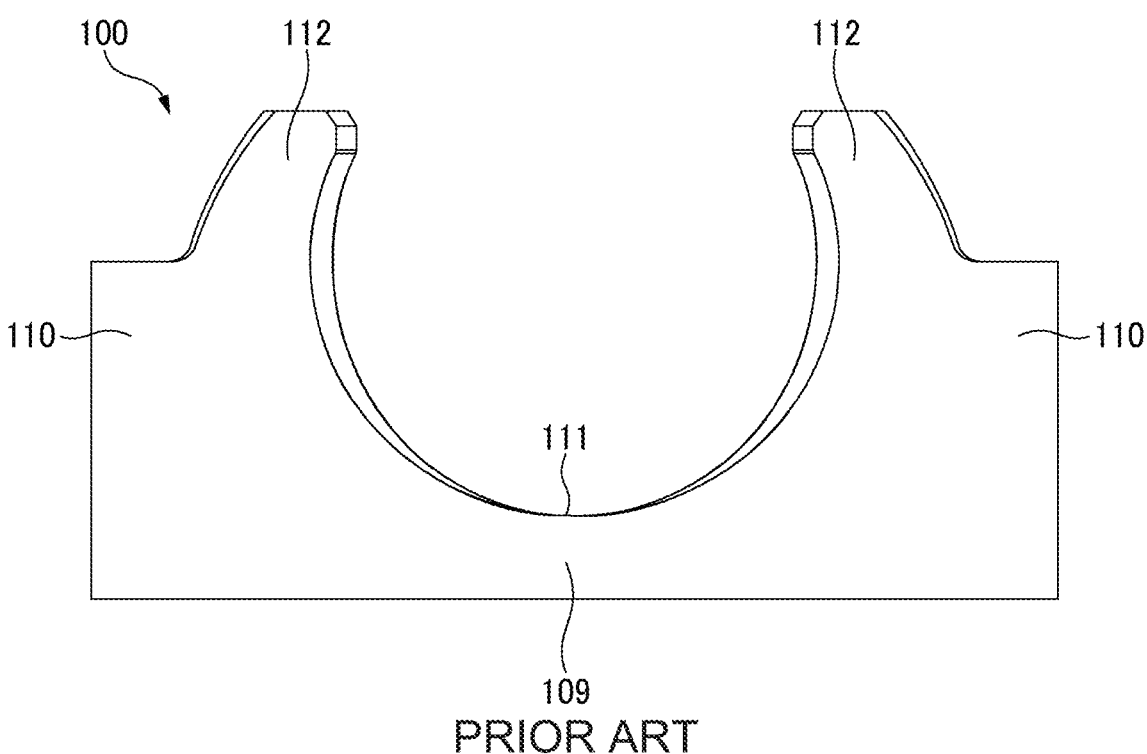
FIG. 15 is a view of a part of a cage according to the related art viewed from the radially outer side.
Figure 16:
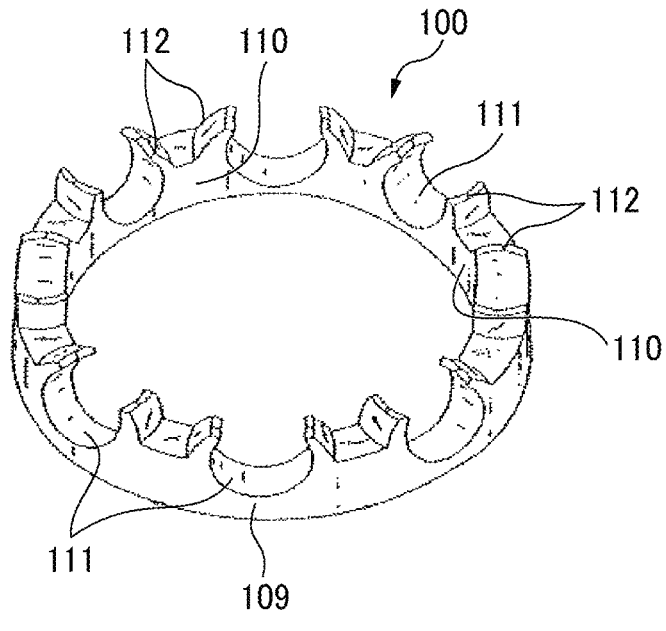
FIG. 16 is a perspective view of a cage according to the related art.

As shown in FIGS. 1 to 4, a crown type cage for a ball bearing (hereinafter also referred to as a "crown type cage" or simply a "cage") 10 of the present embodiment is applied to a ball bearing 1 shown in FIG. 14 similarly to a cage 100 of the related art shown in FIGS. 15 and 16.

The crown type cage 10 is made of, for example, resin materials such as nylon 46 (polyamide 46, PA46), nylon 66 (polyamide 66, PA66), polyamide 9T (PA9T), polyamide 10T (PA10T), L-PPS, and PEEK, or another resin material. Further, in order to improve the strength of the cage 10, a resin composition to which several tens of percent (for example, 10 to 50% by weight) of a fiber-reinforced material (carbon fiber, glass fiber, aramid fiber, and the like) is added may be used. As a method for manufacturing the cage 10, a method of injection molding using a mold and a manufacturing method with a 3D printer are exemplified.

Figure 14:
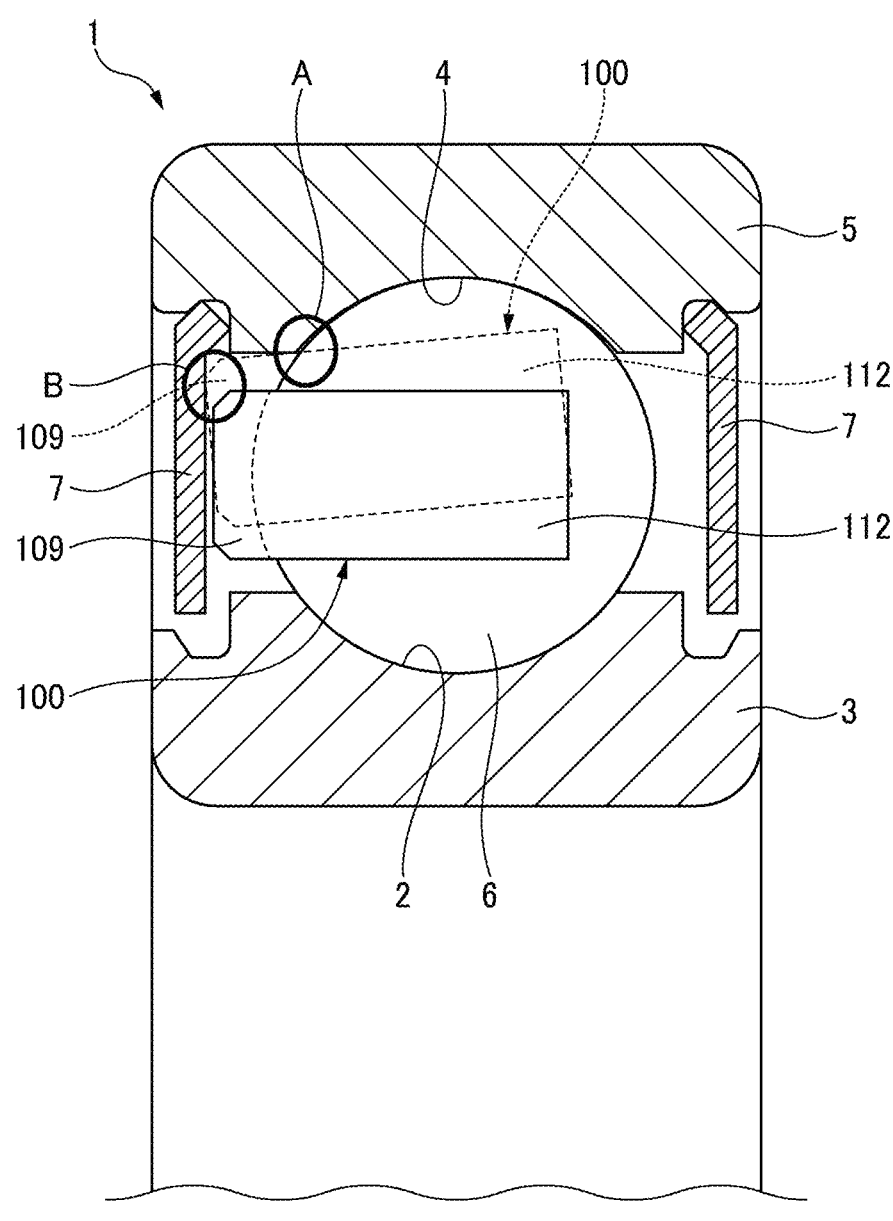
FIG. 14 is a cross-sectional view of a ball bearing according to the related art.

The crown type cage 10 includes an annular main portion 20, a plurality of pillar portions 30 protruding in the axial direction from an upper surface 21 of the main portion 20 at predetermined intervals in the peripheral direction, and a spherical pocket 40 formed between the adjacent pillar portions 30 and 30 and capable of holding the balls 6 (refer to FIG. 14).

A plurality of spherical recessed surfaces 23 having a spherical shape are formed on the upper surface 21 of the main portion 20 at predetermined intervals in the peripheral direction. This spherical recessed surface 23 is formed over the entire radial width of the main portion 20 and forms the pocket 40.

The pillar portion 30 protrudes in the axial direction from the radially inner side portion of the upper surface 21 of the main portion 20. Therefore, the upper surface 21 of the main portion 20 is exposed on the radially outer side of the pillar portion 30. In the crown type cage 100 (refer to FIG. 16) of the related art, the pillar portion 110 protrudes in the axial direction from the entire radial width of the upper surface of the main portion 109, and thus the pillar portion 30 of the present application is different in this respect. That is, in the present application, a configuration is adopted in which a region on the radially outer side (region S1 indicated by a broken line in FIG. 4) of the pillar portion 30 (claw portion 31) is cut.

The pillar portion 30 has a pair of claw portions 31 and 31 and a connection portion 33 that connects the pair of claw portions 31 and 31.

Tip end portions 31A and 31A of the pair of claw portions 31 and 31 are spaced apart from each other in the peripheral direction. In addition, between the tip end portions 31A and 31A of the two adjacent claw portions 31 and 31 forming the pocket 40, an inlet 41 having a width shorter than the diameter of the ball 6 (refer to FIG. 14) and for inserting the ball 6 is provided.

The claw portion 31 has a spherical first peripheral surface 31B forming the pocket 40 and a second peripheral surface 31C opposite to the first peripheral surface 31B.

The second peripheral surfaces 31C and 31C of the pair of claw portions 31 and 31 are curved, respectively, and smoothly connected to an upper surface 33A of the connection portion 33. The upper surface 33A of the connection portion 33 corresponds to a substantially U-shaped bottom portion formed by the pair of second peripheral surfaces 31C and 31C. The upper surface 33A of the connection portion 33 (the bottom portions of the pair of second peripheral surfaces 31C and 31C) is positioned slightly above (on one axial side) the upper surface 21 of the main portion 20 (refer to FIGS. 1 and 4). Therefore, the pair of second peripheral surfaces 31C and 31C form a substantially U-shaped recess portion with the bottom portions (the upper surface 33A of the connection portion 33) positioned relatively below (on the other axial side). In the crown type cage 100 of the related art (refer to FIG. 15), the upper surface of the connection portion (the bottom portions of the pair of second peripheral surfaces) is positioned considerably above the upper surface of the main portion 109. That is, in the present application, a configuration is adopted in which a region interposed between the second peripheral surfaces 31C and 31C of the pair of claw portions 31 and 31 (a region S2 indicated by broken lines in FIG. 2) is cut.

The first peripheral surfaces 31B and 31B of the two adjacent claw portions 31 and 31 and the spherical recessed surface 23 of the main portion 20 form the pocket 40. These two first peripheral surfaces 31B and 31B and the spherical recessed surface 23 are smoothly connected to each other to form the spherical recessed surface of the pocket 40. The radius of curvature of the spherical recessed surface of pocket 40 is set larger than the radius of curvature of the rolling surface of the ball 6 (refer to FIG. 14).

In this manner, since the plurality of pockets 40 are connected by the main portion 20, when a centrifugal force is applied to the cage 10 during high-speed rotation, the cage 10 tends to be tilted to the radially outer side around the main portion 20. In order to suppress this tilt, in the present application, the regions S1 and S2 are cut as described above.

$F = mr\omega^2$ where F is the centrifugal force, m is the mass, r is the distance from a rotation shaft to a rotating object (the cage 10), and $\omega$ is the angular velocity. The stress $\sigma$ generated in the cage 10 (especially the bottom portion of the pocket 40) and the deformation amount 6 of the cage 10 are approximately proportional to the centrifugal force F. Therefore, when the axial width of the ball bearing 1, the inner diameter of the inner ring 3, and the outer diameter of the outer ring 5 are constant, it is necessary to reduce the mass m of the cage 10 in order to reduce the stress a and the deformation amount 6. Further, since the deformation amount 6 of the cage 10 is substantially inversely proportional to the rigidity of the cage 10, when the shape of the cage 10 does not change, the rigidity of the cage 10, that is, the Young's modulus may be increased.

Figure 1:
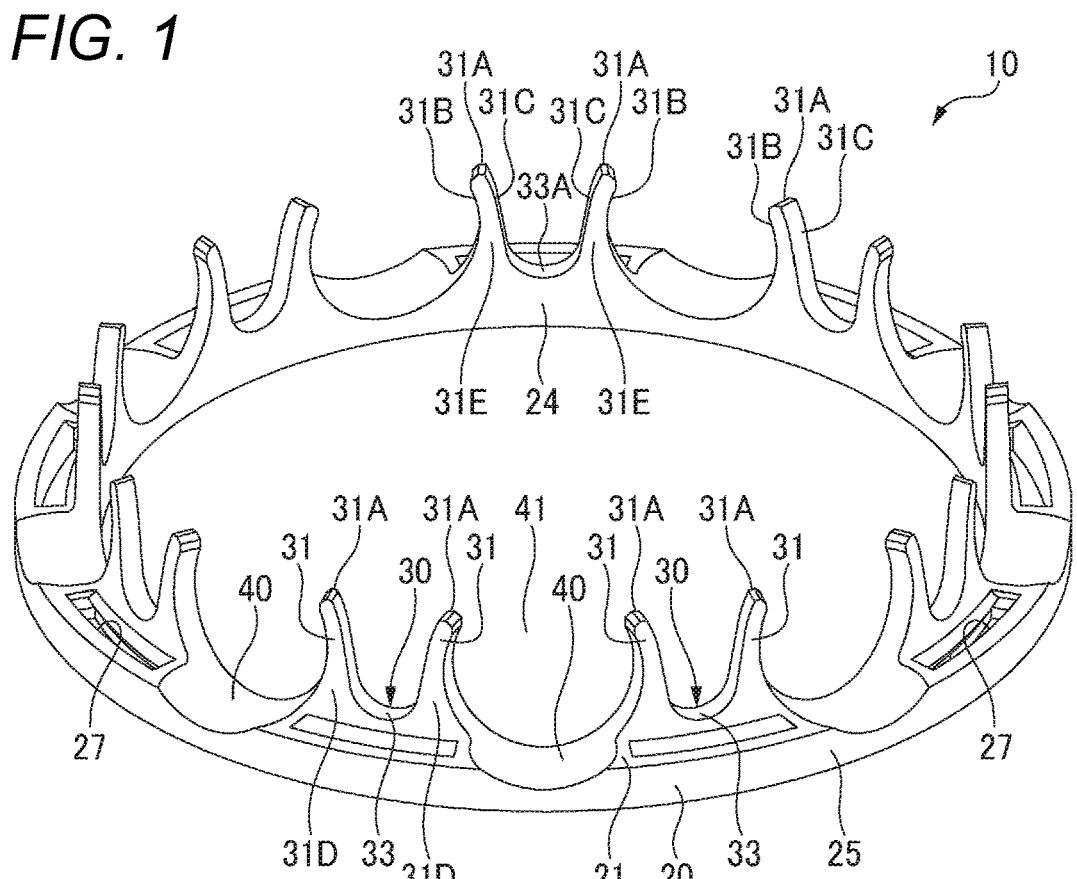
FIG. 1 is a perspective view of a cage according to a first embodiment.
Figure 2:
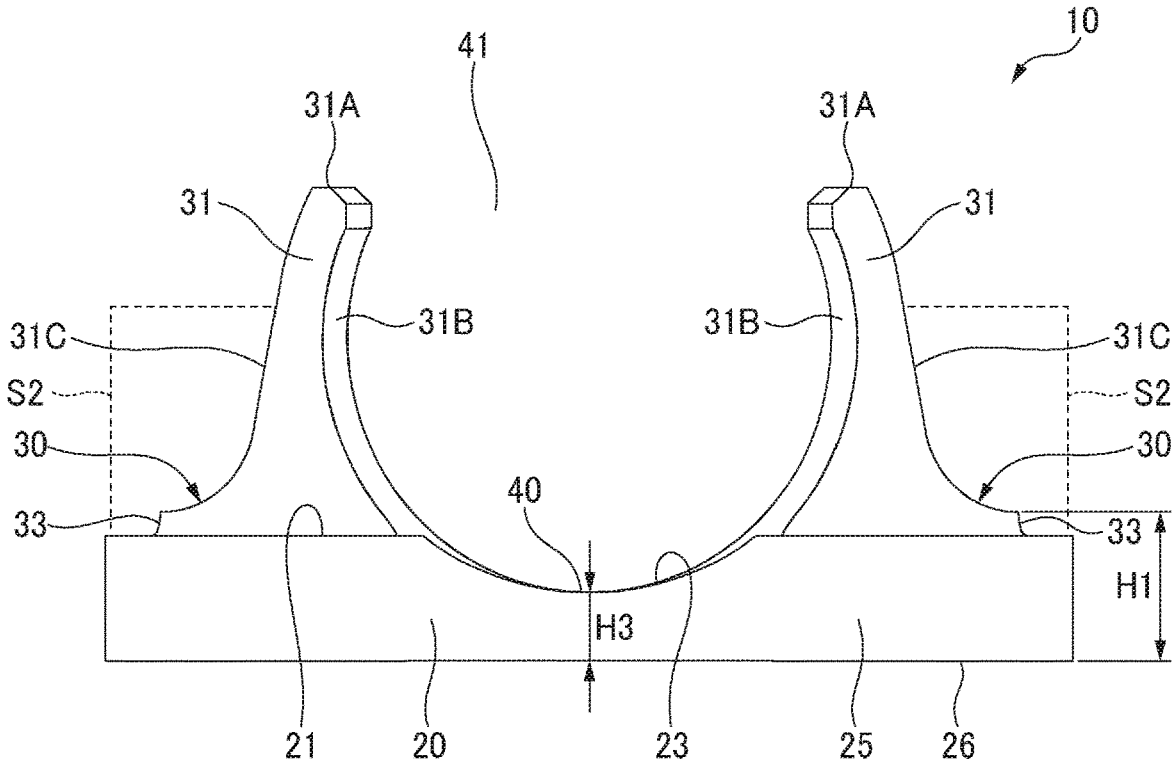
FIG. 2 is a view of a part of the cage according to the first embodiment viewed from a radially outer side.
Figure 3:
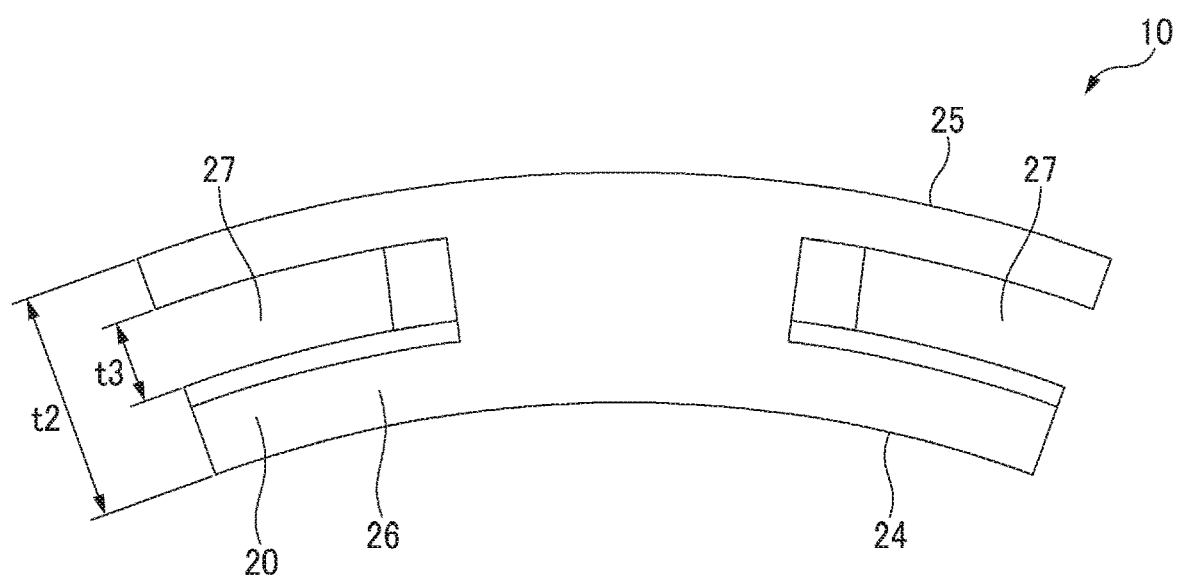
FIG. 3 is a view of a part of the cage according to the first embodiment viewed from the bottom surface side.
Figure 4:
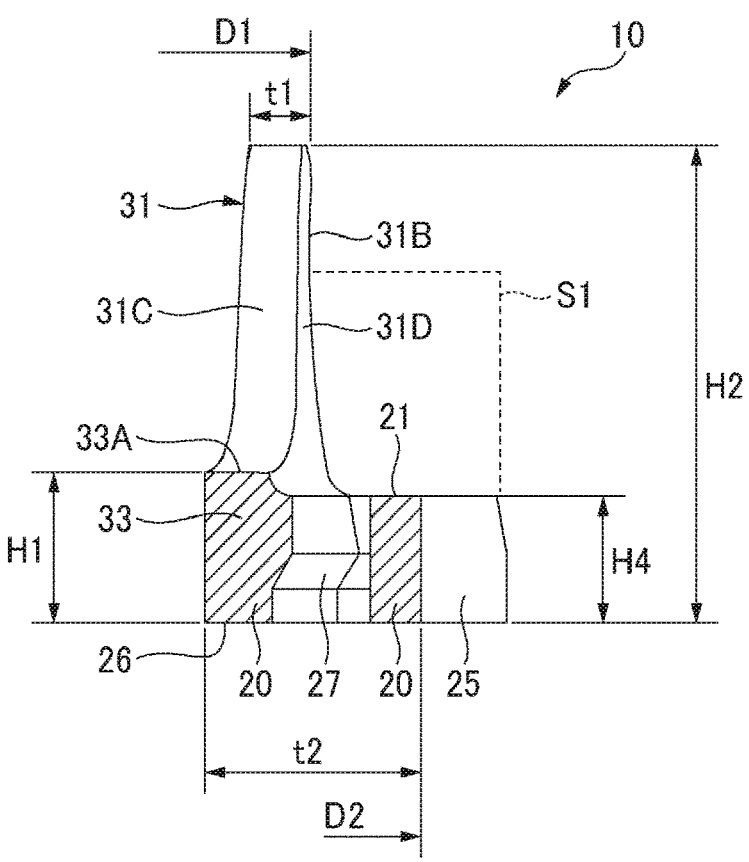
FIG. 4 is a partial cross-sectional perspective view of a part of the cage according to the first embodiment.

As shown in FIG. 4, an outer diameter D1 of the claw portion 31 is set smaller than an outer diameter D2 of the main portion 20. That is, an outer peripheral surface 31D of the claw portion 31 (the pillar portion 30) is positioned inside an outer peripheral surface 25 of the main portion 20 by (D2−D1) in the radial direction. In addition, an inner peripheral surface 31E of the claw portion 31 (pillar portion 30) is smoothly connected to an inner peripheral surface 24 of the main portion 20 and forms the inner peripheral surface of the cage 10 without a step. Furthermore, a radial width t1 of the claw portion 31 is set to ½ or less of a radial width t2 of the main portion 20. By setting D1<D2 and t1≤(t2/2) in this manner, a configuration is adopted in which the region S1 on the radially outer side of the claw portion 31 (pillar portion 30) is cut.

Further, an axial width H1 (vertical width in FIG. 4) from the upper surface 33A of the connection portion 33 of the pillar portion 30 to a bottom surface 26 of the main portion 20 is set to ½ or less of an axial width H2 of the cage 10. By setting H1≤(H2/2) in this manner, a configuration is adopted in which the region S2 (refer to FIG. 2) on the back surface side of the claw portion 31 (the opposite side of the pocket 40, the second peripheral surface 31C side) is cut.

In addition, when the axial width H1 is made extremely small, since there is a possibility that the strength of the cage 10 decreases, the axial width H1 is preferably larger than an axial width H3 (refer to FIG. 2) of the main portion 20 at the bottom portion of the pocket 40 (H1>H3), and is more preferably larger than an axial width H4 (refer to FIG. 4) of a part of the main portion 20 where the pocket 40 (spherical recessed surface 23) is not formed (H1>H4). In this manner, the dimensional relationship in the axial direction preferably satisfies H3<H4<H1≤(H2/2).

Further, the main portion 20 is provided with an opening portion 27 which is open in the axial direction between adjacent pockets 40 and 40. The opening portion 27 penetrates the bottom surface 26 from the upper surface 21 of the main portion 20 in the axial direction. The opening portion 27 is positioned on the radially outer side of the pillar portion 30 (the pair of claw portions 31 and 31). That is, at least a part of the opening portion 27 overlaps the pillar portion 30 (the pair of claw portions 31 and 31) in the peripheral direction. Moreover, the claw portion 31 and the opening portion 27 are provided offset in the radial direction, and the opening portion 27 is positioned on the radially outer side of the claw portion 31. The shown peripheral wall portion of the opening portion 27 is composed of a stepped surface (refer to FIG. 4), a tapered surface, or the like, but the shape is not particularly limited. Noted that the case where the peripheral wall portion of the opening portion 27 is configured by a stepped surface, a tapered surface, or the like is preferable because the cage 10 can be easily removed from the mold during injection molding, compared to the case where the peripheral wall portion is configured by a simple flat surface.

When a radial width t3 (refer to FIG. 3) of the opening portion 27 becomes extremely large, there is a possibility that the radial width of other parts of the cage 10 becomes small, the strength decreases, and the resin does not flow and voids are generated when the cage 10 is manufactured by injection molding. Therefore, the width of each part of the cage 10 is preferably 1 mm or more. Therefore, the radial width t3 of the opening portion 27 is preferably approximately $(t2/3) \leq t3 \leq (t2/2)$ with respect to the radial width t2 of the main portion 20.

As described above, with the cage 10 of the present embodiment, $D1 < D2$, $t1 \leq (t2/2)$, and $H1 \leq (H2/2)$ are satisfied, and the opening portions 27 are formed. Thus, the weight of the cage 10 is reduced, and deformation due to the centrifugal force during high-speed rotation can be suppressed. Therefore, the cage 10 can be prevented from coming into contact with the outer ring 5, the shield plate 7, and the like, and wear, vibration, and heat generation of the cage 10 can be suppressed. Moreover, the claw portion 31 and the opening portion 27 are provided offset in the radial direction, and the opening portion 27 is positioned on the radially outer side of the claw portion 31. As a result, the weight of the cage 10 can be reduced, the distance between the claw portions 31 and the outer ring 5 can be secured, and thus contact with the outer ring 5 can be suppressed even when the claw portions 31 are deformed. Further, since the claw portion 31 is shaped to hold the ball 6 from the radially inner side, in order for the claw portion 31 to deform when the centrifugal force acts, it is necessary to get over the ball 6, and there is also an effect of suppressing the deformation of the claw portion 31.

Second Embodiment

Figure 5:
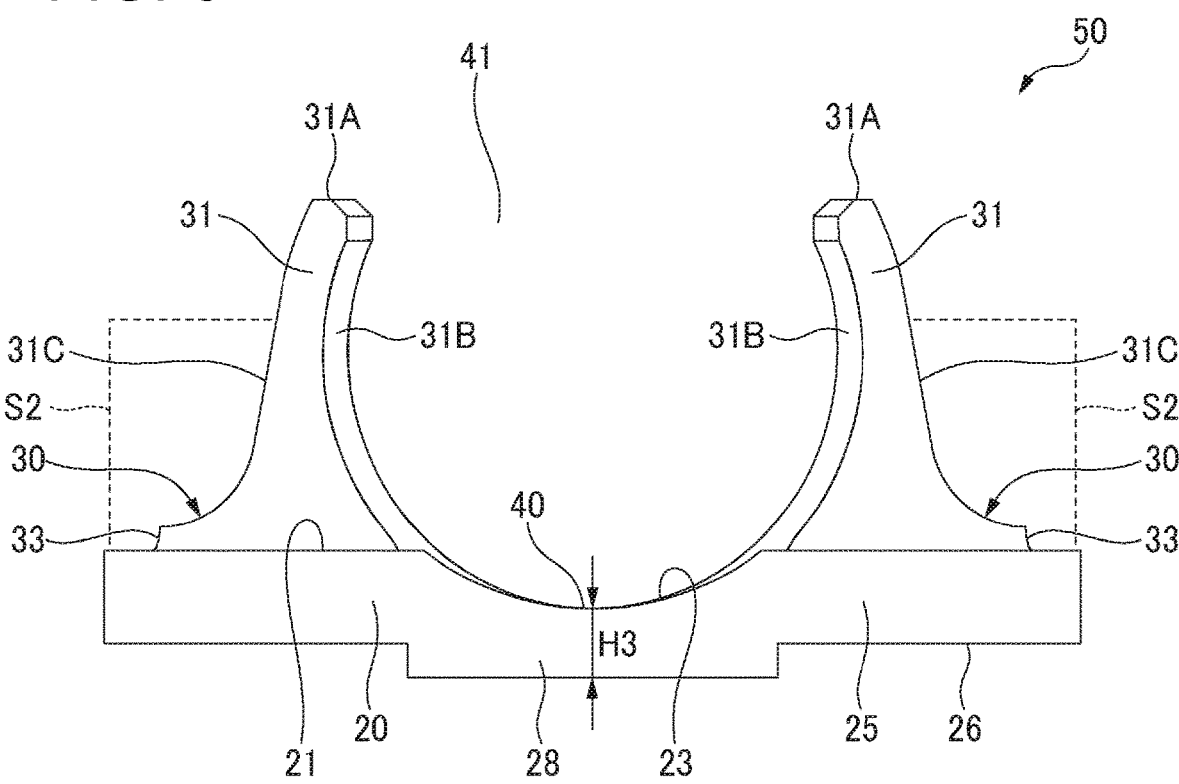
FIG. 5 is a view of a part of a cage according to a second embodiment viewed from a radially outer side.
Figure 6:
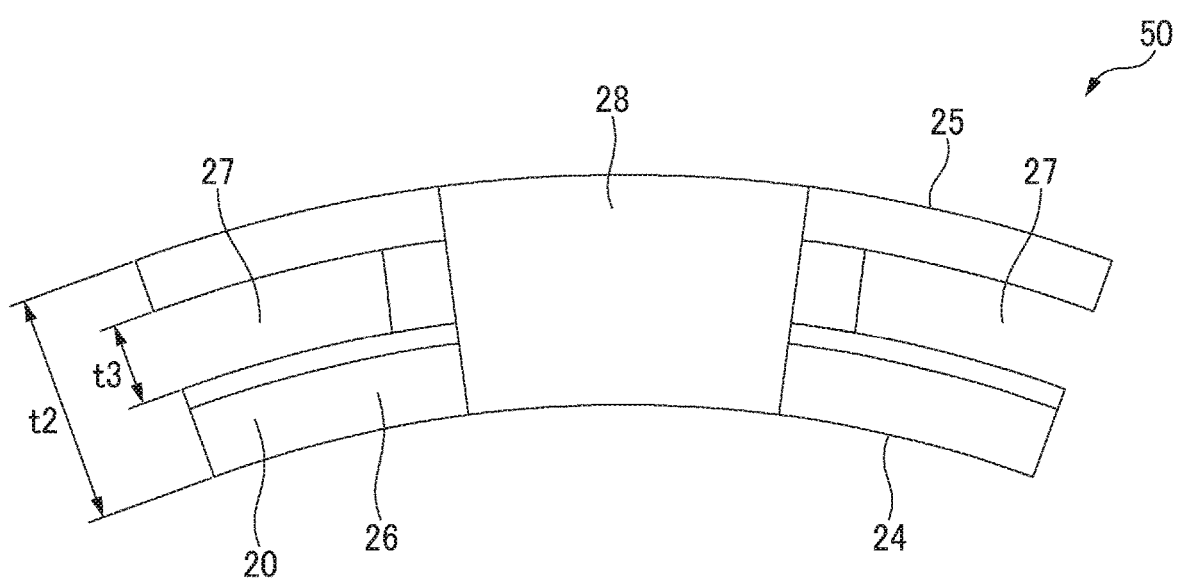
FIG. 6 is a view of a part of the cage according to the second embodiment viewed from the bottom surface side.
Figure 7:
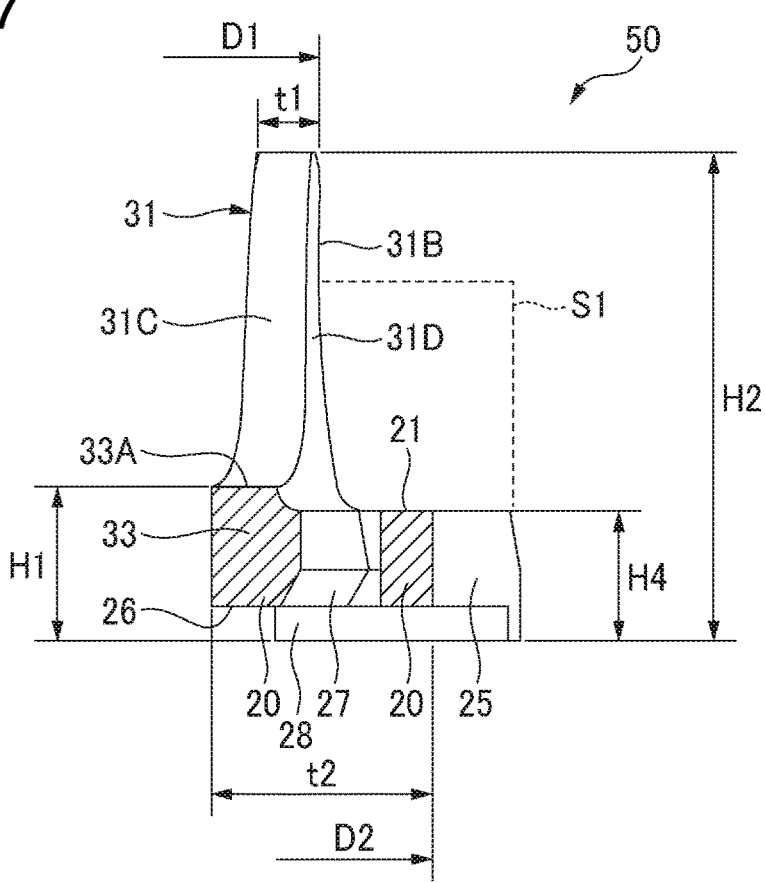
FIG. 7 is a partial cross-sectional perspective view of a part of the cage according to the second embodiment.

FIGS. 5 to 7 disclose a cage 50 according to a second embodiment. The cage 50 of the present embodiment differs from the cage 50 of the first embodiment in that the bottom surface 26 of the main portion 20 is provided with a projection portion 28. Since the rest of the configuration is the same as that of the above-described embodiment, the description thereof will be omitted by attaching reference numerals to the drawings.

The projection portion 28 protrudes in the axial direction (a direction opposite to a direction in which the claw portion 31 extends in the vertical direction in FIG. 5) from the bottom surface 26 of the main portion 20 between the adjacent opening portions 27 and 27. That is, the bottom surface 26 of the main portion 20 has the plurality of projection portions 28 formed at predetermined intervals in the peripheral direction below the plurality of pockets 40.

The projection portion 28 preferably overlaps the pocket 40 in the peripheral direction and the radial direction. That is, the peripheral range and the radial range in which the projection portion 28 is provided are preferably substantially the same as the peripheral range and the radial range in which the spherical recessed surface 23 of the main portion 20 forming the pocket 40 is provided. The radial width and peripheral width of the projection portion 28 of the present embodiment are substantially the same as the radial width (the radial width t2 of the main portion 20) and the peripheral width of the pocket 40.

With the cage 50 of the second embodiment, the effect of suppressing stress and deformation generated by the centrifugal force is not so different from that of the first embodiment, but the cage 50 is effective when the cage 50 is incorporated into the bearing 1 consisting of the inner ring 3, the outer ring 5, and the balls 6. That is, as will be described later, strain generated in the claw portions 31 of the cage 50 is reduced.

Third Embodiment

Figure 8:
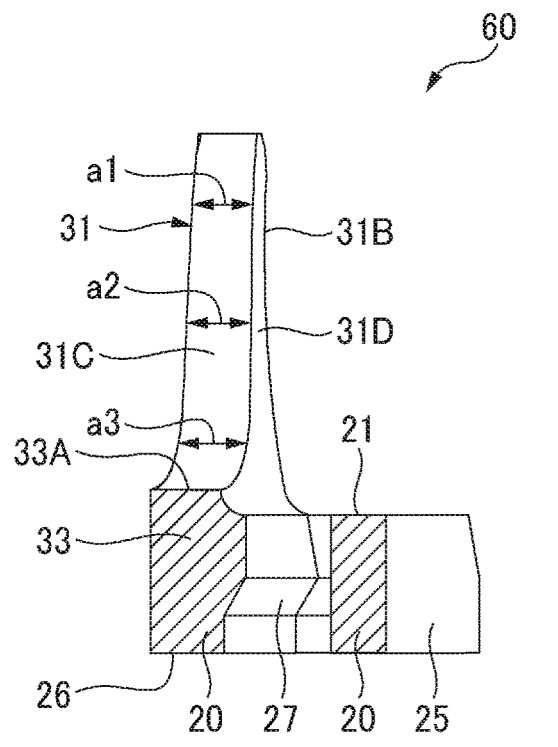
FIG. 8 is a partial cross-sectional perspective view of a part of a cage according to a third embodiment.

FIG. 8 discloses a cage 60 according to a third embodiment. The cage 60 of the present embodiment differs from the cage 60 of the above-described embodiment in the radial dimension of the claw portions 31. Since the rest of the configuration is the same as that of the above-described embodiment, the description thereof will be omitted by attaching reference numerals to the drawings.

In the cage 60 of the present embodiment, the radial width of the claw portion 31 decreases from the main portion 20 side toward the tip end portion 31A of the claw portion 31. That is, the relationship among radial widths a1, a2, and a3 of the claw portion 31 in FIG. 8 satisfies $a1 < a2 < a3$.

With such a configuration, the stress and strain generated in the claw portion 31 can be reduced. In particular, this configuration is effective when the tip end portion 31A of the claw portion 31 receives force from the ball 6. Moreover, when the cage 60 is injection molded, the cage 60 can be easily removed from the mold, which is effective.

Fourth Embodiment

Figure 9:
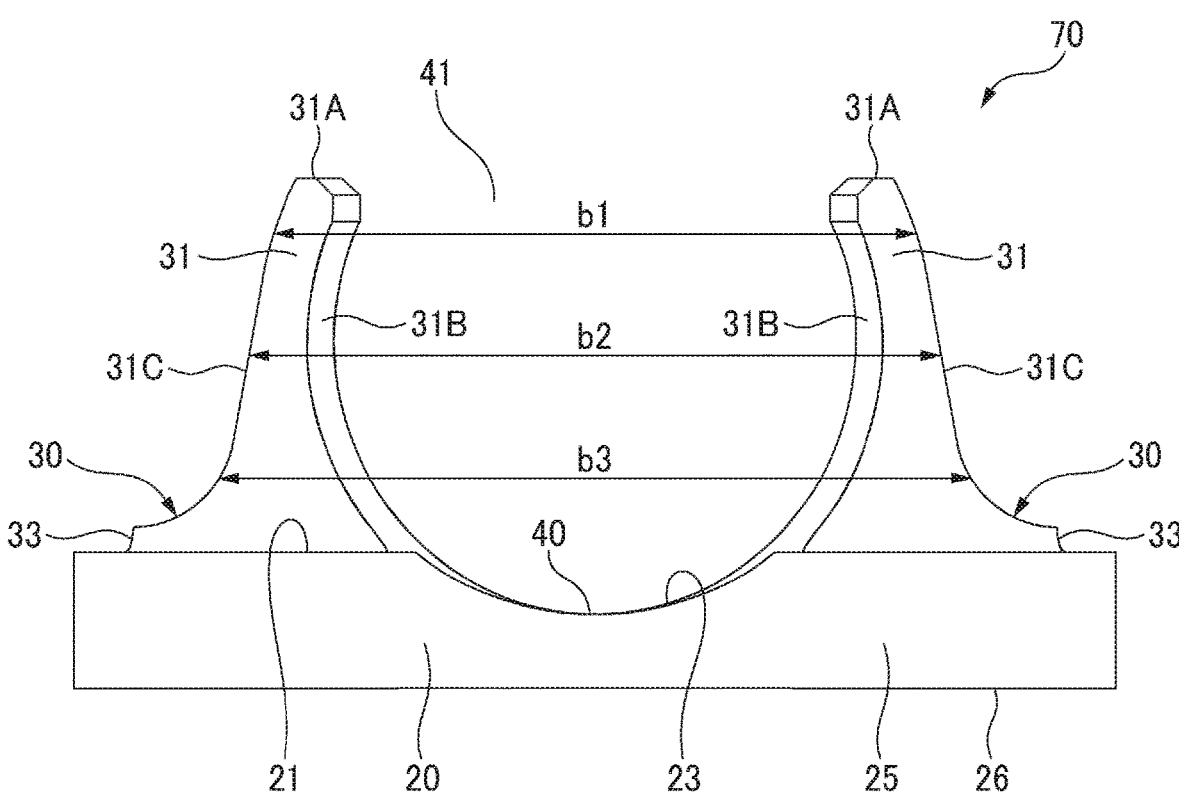
FIG. 9 is a view of a part of a cage according to a fourth embodiment viewed from a radially outer side.

FIG. 9 discloses a cage 70 according to a fourth embodiment. The cage 70 of the present embodiment differs from the cage 70 of the first embodiment in the peripheral distance between the second peripheral surfaces 31C and 31C of the two adjacent claw portions 31 and 31 forming the pocket 40. Since the rest of the configuration is the same as that of the above-described embodiment, the description thereof will be omitted by attaching reference numerals to the drawings.

In the cage 70 of the present embodiment, in the two adjacent claw portions 31 and 31 forming the pocket 40, the peripheral distance between the two second peripheral surfaces 31C and 31C decreases from the main portion 20 side to the tip end portion 31A of the claw portion 31. That is, the relationship of the peripheral distances b1, b2, and b3 between the second peripheral surfaces 31C and 31C of the two adjacent claw portions 31 and 31 in FIG. 9 satisfies $b1 < b2 < b3$.

With such a configuration, the stress and strain generated in the claw portion 31 can be reduced. In particular, this configuration is effective when the tip end portion 31A of the claw portion 31 receives force from the ball 6. Moreover, when the cage 70 is injection molded, the cage 70 can be easily removed from the mold, which is effective.

EXAMPLES

Figure 10A:
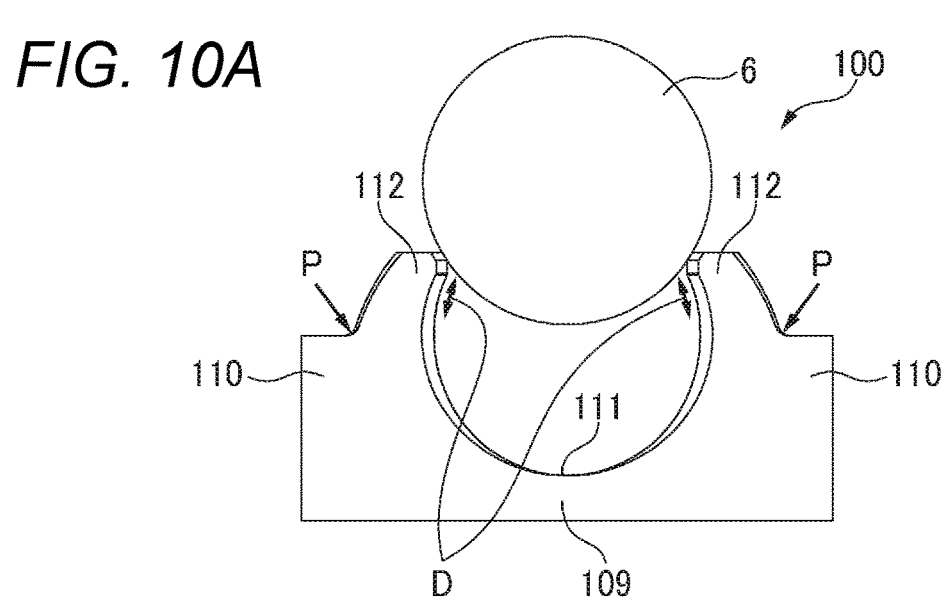
FIG. 10A to 10C are views showing a strain generation region when a ball is incorporated into the cage.
Figure 10B:
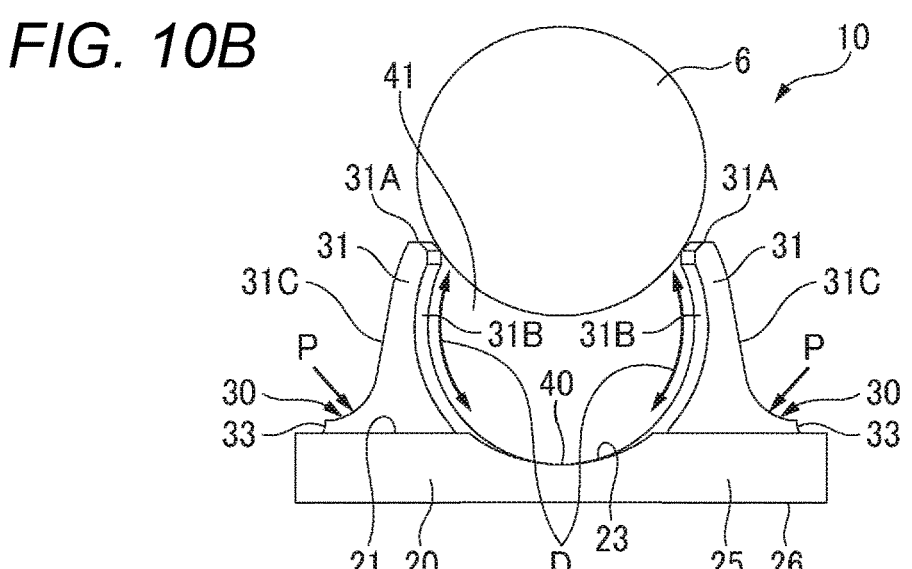
Figure 10C:
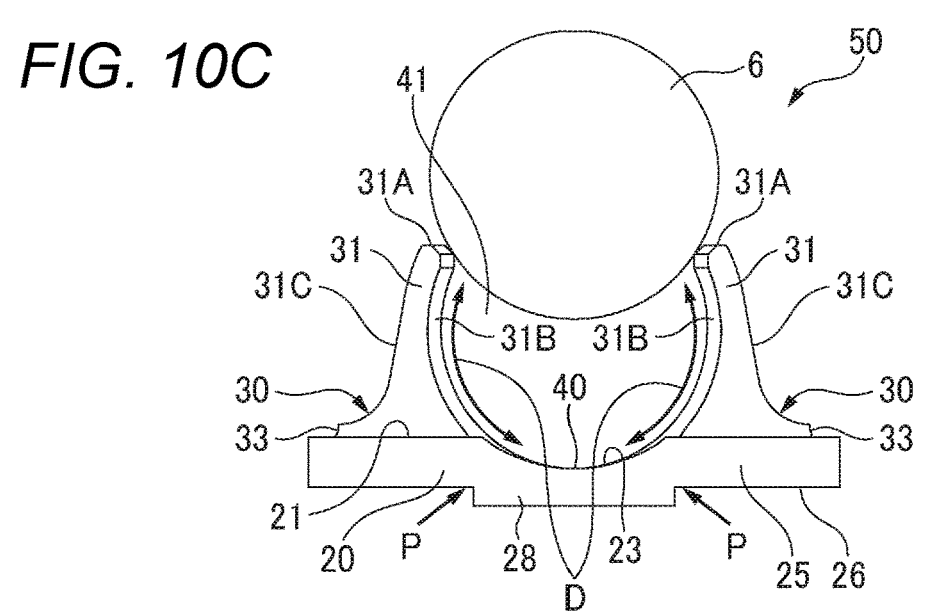

In order to confirm the effects of the present invention, analysis was performed using the finite element method. The cages 10 and 50 to be analyzed are crown type resin cages used for bearings with an inner diameter of 35 mm. Based on the crown type resin cage of the related art, the shape was set based on the embodiment of the present invention. That is, as shown in FIGS. 10A to 10C, the cage 100 shown in FIGS. 15 and 16 is adopted as a conventional product (FIG. 10A), the cage 10 of the first embodiment shown in FIGS. 1 to 4 is adopted as Example 1 (FIG. 10B), and the cage 50 of the second embodiment shown in FIGS. 5 to 7 is adopted as Example 2 (FIG. 10C).

Regarding the cage size, both in Comparative Example and Examples 1 and 2, the inner diameter of the cages 10 and 50 (100) was set to 49 mm, the maximum outer diameter of the main portion 20 (109) was set to 58 mm, and the axial height of the cages 10 and 50 (100) was set to 10 mm. The axial width H1 from the upper surface 33A of the connection portion 33 of the pillar portion 30 (110) to the bottom surface 26 of the main portion 20 (109) was set to 7 mm in Comparative Example and 3 mm in Examples 1 and 2. In addition, the radial thickness of the tip end portion 31A of the claw portion 31 (112) was set to 4.7 mm in Comparative Example and 1.2 mm in Examples 1 and 2. The radial thickness of the opening portion 27 of the main portion 20 was set to 2 mm in Examples 1 and 2. The axial thickness of the projection portion 28 in Example 2 was set to 0.9 mm.

As the physical property values of the cages 10 and 50 (100), values corresponding to nylon 46 (PA46) at high temperatures were used, assuming that the bearings would be used in high-speed rotation. Specifically, Young's modulus was set to 3500 MPa, Poisson's ratio was set to 0.4, and density was set to 1.38 g/cm3. The rotation speed of the inner ring was 30,000 rpm.

Figure 12A:
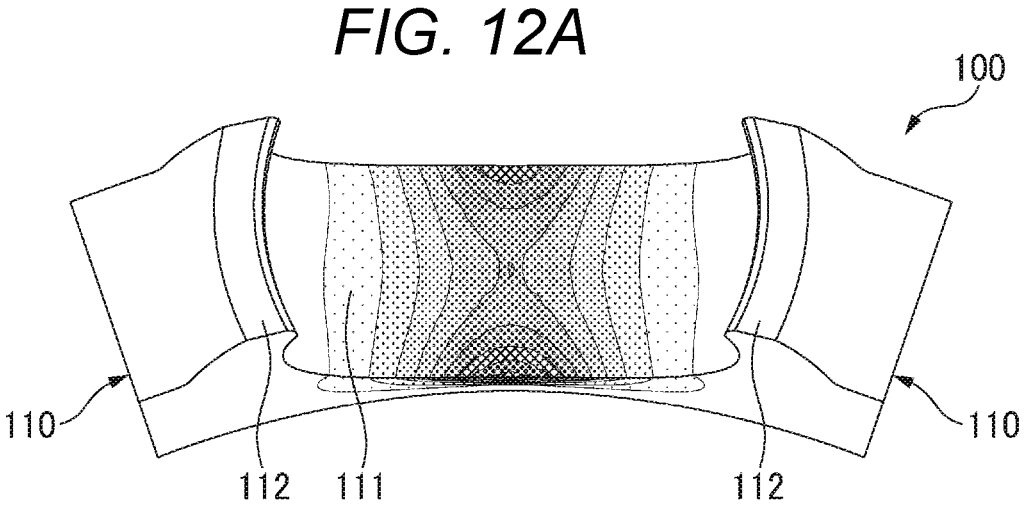
FIGS. 12A to 12C are views showing the maximum principal stress distribution generated in the cage due to a centrifugal force.
Figure 12B:
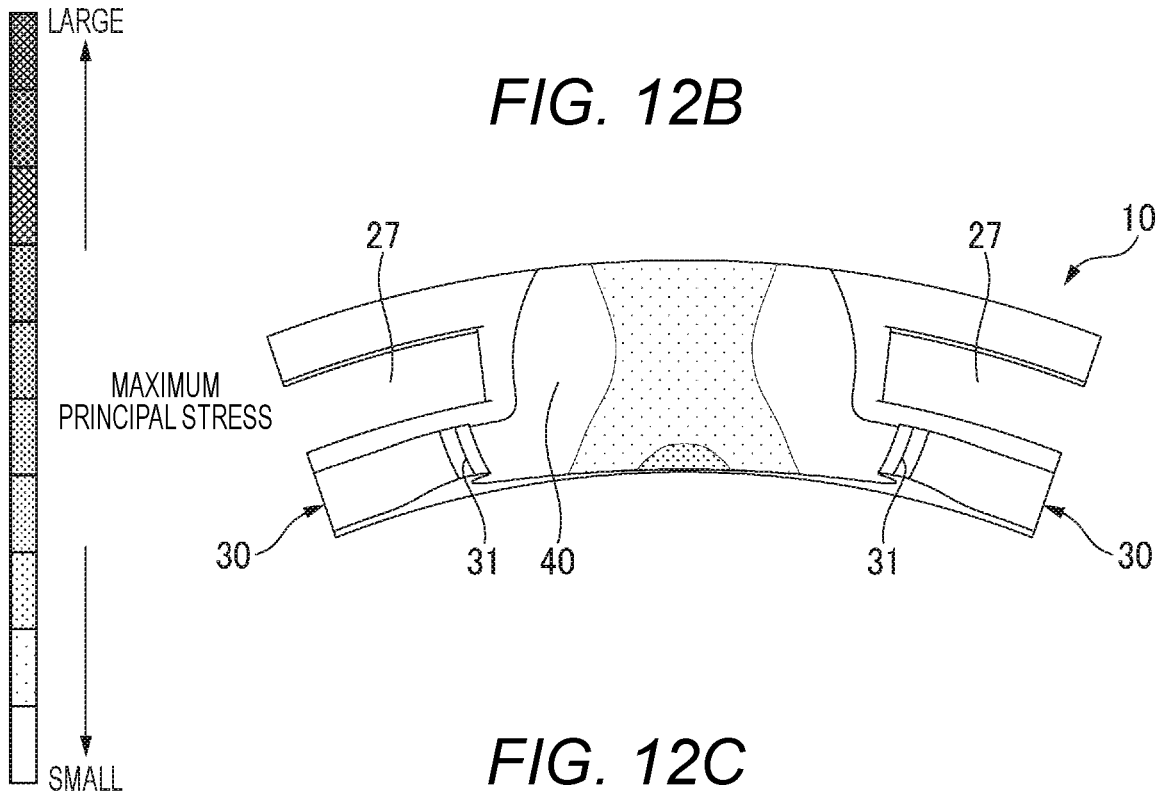
Figure 12C:
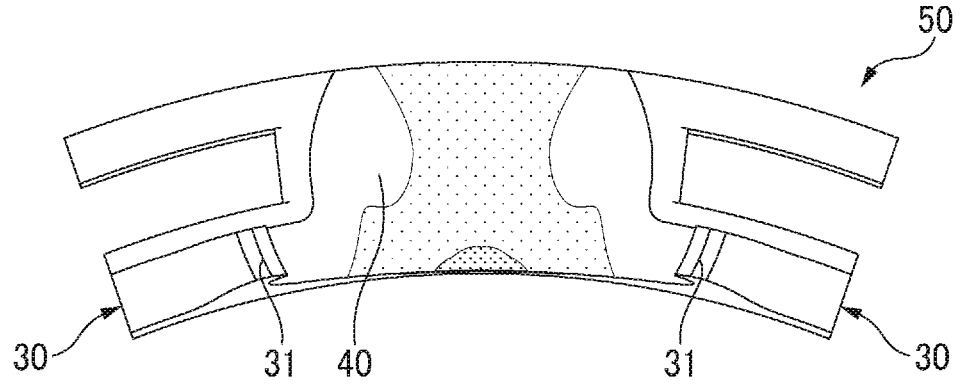

The maximum principal stress distribution generated in the cages 10 and 50 (100) by the centrifugal force is shown in FIGS. 12A to 12C. It can be seen that a large stress is generated in the related art of FIG. 12A. Since the deformation magnification is shown as 1, it can be seen that the deformation, that is, the tilt of the tip end of the claw portion 112 is large. On the other hand, in Examples 1 and 2 shown in FIGS. 12B and 12C, it can be seen that the generation of stress is suppressed as compared with the related art.

Figure 11:
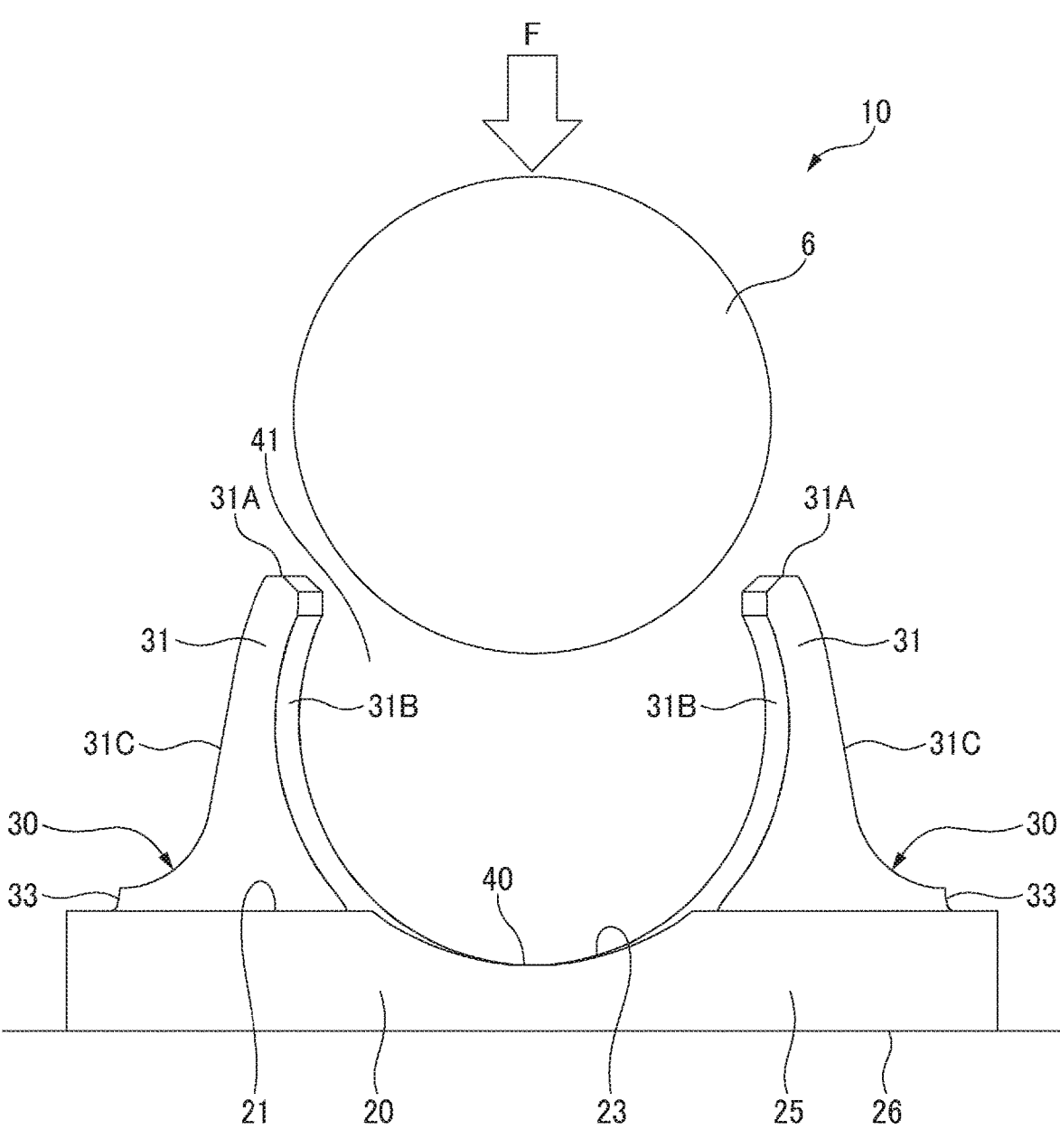
FIG. 11 is a view showing how a ball is incorporated into the cage.
Figure 13:
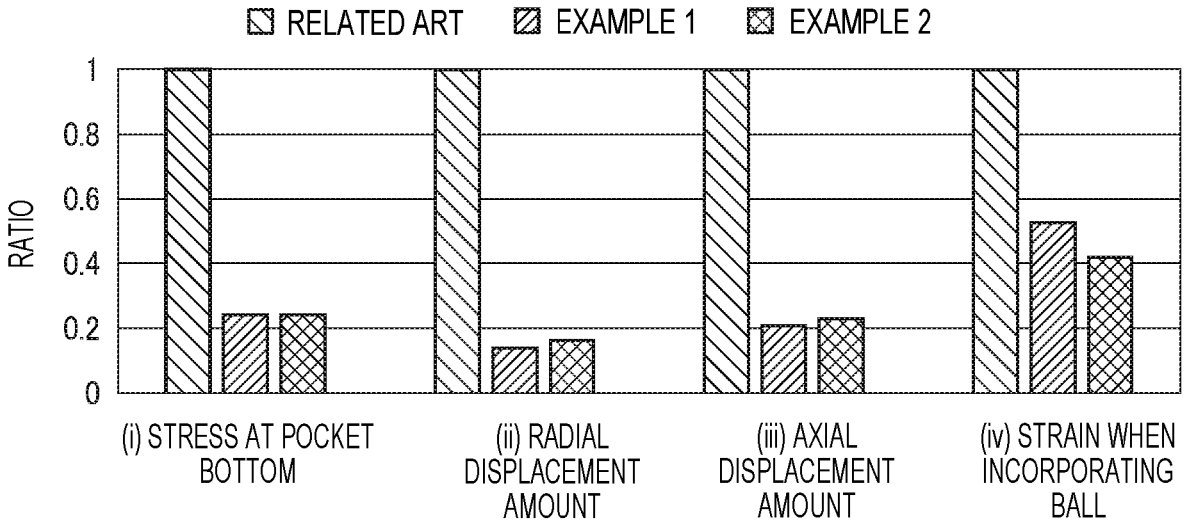
FIG. 13 is a view showing (i) the maximum value of the maximum principal stress generated at the pocket bottom of the cage, (ii) the radial displacement amount at a position where the outer peripheral surface of the cage and an outer ring 5 are thought to come into contact, (iii) the axial displacement amount of the lowermost portion of the outer peripheral surface of the base portion, and (iv) the maximum value of the maximum principal strain generated in the claw portion.

FIG. 13 shows (i) the maximum value of the maximum principal stress generated in the pocket bottom of the cages 10 and 50 (100), (ii) the radial displacement amount at a position (the part B in FIG. 14) where the outer peripheral surface of the cages 10 and 50 (100) and the outer ring 5 are considered to come into contact with each other, (iii) the axial displacement amount of the lowermost portion of the outer peripheral surface of the main portion 20 (109), and (iv) the maximum value of the maximum principal strain generated in the claw portion 31 (112). In addition, (iv) the maximum value of the maximum principal strain generated in the claw portion 31 (112) is obtained by assuming that the cages 10 and 50 (100) are inserted into the bearing 1 consisting of the inner ring 3, the outer ring 5, and the balls 6, modeling a part of the cage 10 as shown in FIG. 11, and performing an analysis of pushing the ball 6 with a load F.

In both Examples 1 and 2, the values of (i) to (iv) were greatly reduced compared to the related art, confirming the effect. There was almost no difference between Example 1 and Example 2 in (i) the stress of the pocket bottom, (ii) the radial displacement amount, and (iii) the axial displacement amount, but (iv) the strain at the time of ball incorporation in Example 2 was reduced by approximately 20% compared to that of Example 1.

It is considered that, this is because, as shown in FIGS. 10A to 10C, when the balls 6 are pushed into the pockets 40 of the cages 10 and 50, the claw portion 31 tends to widen in the circumferential direction with the low-rigidity part as a fulcrum P. That is, it is considered that, this is because the farther the fulcrum P is from the tip end portion 31A of the claw portion 31, the more the generated strain is dispersed, and thus the maximum value decreases.

In the related art, the part near the tip end portion of the claw portion 112 tends to widen toward the fulcrum P, and thus the strain region (strain generation region D) generated in the claw portion 112 becomes narrower and the strain increases. On the other hand, in Example 1, since the distance from the tip end portion 31A of the claw portion 31 to the fulcrum P is long, the strain generation region D widens, and the strain is lower than in the related art. Furthermore, in Example 2, since the distance from the tip end portion 31A of the claw portion 31 to the fulcrum is long, the strain generation region D further widens, and the strain is further reduced than in Example 1.

It should be noted that the cages 10 and 50 of Examples 1 and 2 as described above are preferably applied to a cage using a resin material having a lower strain strength than nylon 46 or nylon 66 because strain can be reduced.

The present application is based on Japanese Patent Application No. 2021-005913 filed on Jan. 18, 2021, and the content thereof is incorporated herein by reference.

REFERENCE SIGNS LIST

1 Ball bearing
2 Inner ring raceway
3 Inner ring
4 Outer ring raceway
5 Outer ring
6 Ball
7 Shield plate
10 Crown type cage for ball bearing
20 Main portion
21 Upper surface
23 Spherical recessed surface
24 Inner peripheral surface
25 Outer peripheral surface
26 Bottom surface
28 Projection portion
27 Opening portion
30 Pillar portion
31 Claw portion
31A Tip end portion
31B First peripheral surface
31C Second peripheral surface
31D Outer peripheral surface
31E Inner peripheral surface
33 Connection portion
33A Upper surface
40 Pocket
41 Inlet
50, 60, 70 Cage

The invention claimed is:

1. A crown type cage for a ball bearing comprising:
an annular main portion;
a plurality of pillar portions protruding in an axial direction from an upper surface of the main portion at predetermined intervals in a peripheral direction; and
a spherical pocket formed between the adjacent pillar portions and having a spherical recessed surface capable of holding a ball, wherein:

the pillar portion has a pair of claw portions of which tip end portions are spaced apart from each other and a connection portion that connects the pair of claw portions;

an inlet having a width shorter than a diameter of the ball and for inserting the ball is provided between the tip end portions of the two adjacent claw portions forming the pocket, a radius of curvature of the spherical recessed surface of the pocket is greater than a radius of curvature of a rolling surface of the ball;

an outer diameter of the claw portion is smaller than an outer diameter of the main portion;

a radial width of the claw portion is ½ or less of a radial width of the main portion;

an axial width H1 from an upper surface of the connection portion of the pillar portion to a bottom surface of the main portion is ½ or less of an axial width H2 of the crown type cage for a ball bearing;

in the main portion, an opening portion that opens in the axial direction is provided between the adjacent pockets, the claw portion and the opening portion are provided offset in a radial direction, and the opening portion is positioned on a radially outer side of the claw portion;

the bottom surface of the main portion has a projection portion protruding in the axial direction between the adjacent opening portions; and the axial width H1 from the upper surface of the connection portion of the pillar portion to the bottom surface of the main portion, the axial width H2 of the crown type cage for a ball bearing, an axial width H3 of the main portion at a bottom portion of the pocket, and an axial width H4 from the upper surface of the main portion to the bottom surface of the main portion, satisfy:

$$H3<H4<H1\leq(H2/2).$$

2. The crown type cage for a ball bearing according to claim 1, wherein a radial range and a peripheral range in which the projection portion is provided are substantially the same as a radial range and a peripheral range in which the spherical recessed surface of the main portion forming the pocket is provided.

3. The crown type cage for a ball bearing according to claim 1, wherein a radial width of the claw portion decreases from the main portion side toward the tip end portion side of the claw portion.

4. The crown type cage for a ball bearing according to claim 1, wherein the claw portion has a first peripheral surface forming the pocket and a second peripheral surface opposite to the first peripheral surface, and in the two adjacent claw portions that form the pocket, a peripheral distance between the two second peripheral surfaces decreases from the main portion side toward the tip end portion side of the claw portion.

5. A ball bearing comprising:

an outer ring;

an inner ring;

a plurality of the balls arranged between the outer ring and the inner ring; and the crown type cage for a ball bearing according to claim 1.

* * * * *